Patented Oct. 20, 1953

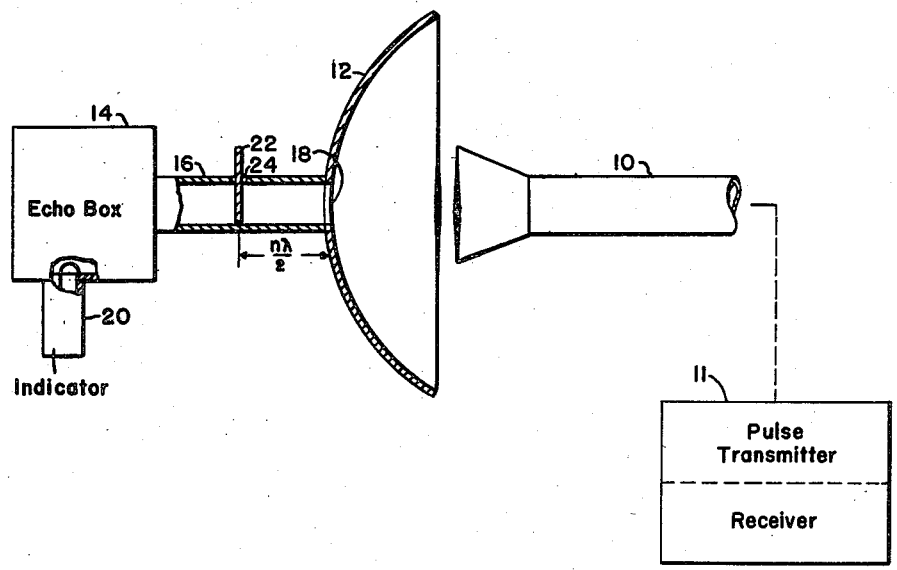

2,656,533

UNITED STATES PATENT OFFICE 2,656,533

PERFORMANCE INDICATOR ARRANGEMENT FOR WAVE ENERGY SYSTEMS

Coleman London, Baltimore, and Richard H. Foy, Linthicum Heights, Md., assignors to Westinghouse Electric Corporation, East Pittsburgh, Pa., a corporation of Pennsylvania Application October 28, 1948, Serial No. 57,018

7 Claims. (Cl. 343—17.7)

This invention relates to pulse-echo type radio ranging or direction finding equipment, commonly known as radar equipment, and has for its principal object to provide an improved arrangement for coupling the output of such a system to a performance indicator.

A further object of the invention is to provide a radar system performance indicator which may readily be manufactured as a permanent, integral part of the radar antenna system, but whose operation can conveniently be controlled by simple means. Still another object is to provide a coupling between a reflector type of radar antenna system and a performance indicator, which coupling will not react unfavorably upon the performance of the radar system when in actual use.

An additional object of the invention is to provide an improved coupling between the reflector element of a known radar antenna system and a performance indicator of the resonant echo box type, whereby an accurate indication is obtained of the performance, output, tuning or other characteristics of the overall radar system, including the effect contributed by a wave guide or conductor which conveys the signal output to the antenna reflector unit.

The above and other objects and advantages of the invention will best be understood from the following detailed specification of a preferred embodiment thereof, by way of example, taken in connection with the appended drawing, the single figure of which is a diagrammatic representation, partly in section, of said embodiment.

The invention as herein disclosed is applied to the antenna system of a radar equipment which may comprise a metallic parabolic reflector as the actual radiating element, radar signals being directed thereto as from a known form of wave guide located along the axis of revolution of the paraboloid and operative to direct radar energy pulses into the convexity formed by the reflector, whence they are distributed into free space in the usual manner. The antenna system is usually adapted to rotate through 360°. Heretofore, in order to obtain an indication of the amplitude, frequency and other characteristics of the emitted energy, it has been customary to direct the energy either from the wave guide aperture or from the reflector itself, where possible, into a cavity resonator or echo box to which is coupled some form of performance indicator, for example, a thermocouple type of meter, neon glow tube or other suitable indicating means. Where provision is made for adjustment of the dimensions of the cavity to resonate the same at different frequencies, such an arrangement provides a frequency meter indicator, but in any case the indication is a measure, in one term or another, of the output, and hence, the performance, of the overall system up to the point at which the echo box is applied. In one application of our invention we do not use a separate indicator, but instead, the radar cavity resonator stores energy obtained from the antenna and emits it back into the input circuit over an interval of time, the emitted electrical field decreases at some decremental rate with time. The energy fed back into the radar receiving circuit gives an indication of radar performance by presenting a pattern similar to radar echoes which gives a maximum indication at minimum range and decreases in amplitude with range and finally disappears at some point in range. For a plan position indicator pattern, some means of breaking up the pattern as the bearing is changed is usually provided. This method usually uses a motor driven tuning element or shutter to cut the echo box out of the circuit at a rate somewhat faster than the rate of antenna rotation so that a series of wedge shaped patterns are presented on the radar screen. These patterns appear on top of the usual radar pattern.

A description of a known form of echo box equipment, and of various means for tuning and adjusting the same, as well as for coupling the meter or other indicating element thereto, is contained in Letters Patent of the United States issued August 13, 1946 to James W. Brannin, No. 2,405,814, to which reference may be made for details of such arrangements.

Referring now to the drawing, there is illustrated a wave guide 10 comprising the feeder portion of a radar antenna system supplied, as there indicated, with any form of pulsed energy from the transmitter portion of a suitable transmitter-receiver system 11. It is to be understood that, by use of known T-R arrangements, the wave guide 10 may also be used for conduction of received signals back to the receiver and indicator portions of the radar set. For the purposes of the present disclosure, however, it may be assumed that guide 10 will be used for both transmission and reception. In order to disseminate this energy into space in a desired concentrated pattern, a reflector 12 is shown as arranged substantially coaxially with the wave guide 10, such reflector being preferably a portion of a paraboloid revolution.

Clearly, the application of an echo box type of performance indicator to such an antenna system is rendered difficult not only by the physical configuration of the illustrated components and surrounding structural elements, but also by the fact that removal of reflector 12 for purposes of the measurement may be physically difficult and may affect the characteristics of the system to be measured. In order to enable the performance indication to be obtained with a maximum of convenience, the present invention contemplates the location of the echo box, here designated by numeral 14, at the end of a suitable wave guide 16 opening into the parabolic reflector 12, as at an aperture 18 therein. Any desired form of indicator or meter 20 may be magnetically or electrostatically coupled to the force field within the echo box, or if desired, the energy stored by the echo box may be returned through the reflector 12 and the guide 10 back to the receiver circuit of the radar to give an indication of the plan position indicator receiver pattern, as hereinbefore described.

Wave energy emanating from the horn or other orifice of the wave guide 10 of the transmitter will in part reach the resonant cavity of the echo box via guide 16 in the desired manner, without involving any rearrangement of the antenna components.

In order to enable the performance indicator portion of the system to be effectively blocked off from its power absorbing relationship when actual operation of the radar set is to be undertaken, the aperture 18 of the reflector 12 may be rendered ineffective to radiation emanating from guide 10 by the provision of a conductive diaphragm or plate 22 movable into or out of position through a slot 24 in the wave guide 16, said slot being located, as indicated in the drawing, at a distance from the vertex of reflector 12 which is an integral number of half wave lengths of the radiation being generated. Under such conditions, as is well understood by those skilled in the art, the chamber formed by that section of wave guide 16 between the vertex of reflector 1 and the stop or plate 22 contains nodes and loops of electric force forming a standing wave pattern, and the aperture 18 is effectively a reflector continuous with the surface of the parabolodial reflector 12, except to the small extent that this chamber absorbs radiation by virtue of the resistivity of the material of its (herein metallic) walls.

Thus, by inserting or removing the conductive plate 22, the performance indicator may be placed into or out of its operative condition with reference to energy propagated along guide 10, providing a convenient method for the making of performance tests without disturbing the arrangement of apparatus as a whole. The plate 22 may be operated as a function of rotation of the antenna over an unimportant sector of the azimuth circle, such as aft, in a ship board installation. The performance indication will be presented as a wedge shaped pattern at a time when it will not interfere with the presentation of useful information, such as an echo signal from an enemy ship. This arrangement also permits the performance indicator to be shut off completely at will, so that normal or useful information may be presented over the entire angle of antenna rotation.

We claim as our invention:

1. A wave energy system comprising a pulse transmitter, a wave antenna system including an energy reflector having an aperture therein, said reflector being the scanning reflector of said wave energy system, means for feeding energy from said transmitter to said antenna, said means comprising a wave guide for receiving wave energy from the output of the pulse transmitter, said wave guide lying on one side of and so as to be appropriately directed at said reflector, and means for checking the performance of said transmitter and antenna feed system, said last-mentioned means comprising performance indicator means, and conduit means communicating said performance indicator means with said reflector aperture, said performance indicator means being arranged as an integral part of said wave energy system, said reflector aperture being so located as to allow said performance indicator means to receive a portion of the energy emanating from said wave guide.

2. A wave energy system comprising a pulse transmitter, a wave antenna system including an energy reflector having an aperture therein, said reflector being the scanning reflector of said wave energy system, means for feeding energy from said transmitter to said antenna, said means comprising a wave guide for receiving wave energy from the output of the pulse transmitter, said wave guide lying on one side of and so as to be appropriately directed at said reflector, and means for checking the performance of said transmitter and antenna feed system, said last-mentioned means comprising performance indicator means, and conduit means communicating said performance indicator means with said reflector aperture, said performance indicator means being arranged as an integral part of said wave energy system, said reflector aperture being so located as to allow said performance indicator means to receive a portion of the energy emanating from said wave guide, and means for selectively reflecting the energy entering said conduit.

3. The invention in accordance with claim 1 wherein said conduit means is a hollow wave guide.

4. The invention in accordance with claim 3 wherein the aperture in said reflector is located at the vertex of said reflector.

5. The invention in accordance with claim 2 wherein said means for selectively reflecting the energy entering said conduit comprises a shorting vane located at a distance $N\lambda/2$ from the end of said conduit which joins said reflector, where N is an integer.

6. The invention in accordance with claim 2 wherein said conduit means is a hollow wave guide.

7. The invention in accordance with claim 6 wherein the aperture in said reflector is located at the vertex of said reflector.

COLEMAN LONDON.
RICHARD H. FOY.

References Cited in the file of this patent

UNITED STATES PATENTS

| Number | Name | Date |
|---|---|---|
| 2,396,044 | Fox | Mar. 5, 1946 |
| 2,414,456 | Edson | Jan. 21, 1947 |
| 2,420,211 | Tourshou | May 6, 1947 |
| 2,426,177 | Anlson | Aug. 26, 1947 |
| 2,460,827 | Isely | Feb. 8, 1949 |
| 2,465,639 | Edson | Mar. 29, 1949 |
| 2,466,439 | Kannenberg | Apr. 5, 1949 |
| 2,477,485 | Jacob | July 26, 1949 |
| 2,479,222 | Edlen | Aug. 16, 1949 |
| 2,489,075 | Bishop | Nov. 22, 1949 |
| 2,498,073 | Edson | Feb. 21, 1950 |
| 2,516,060 | Levenson | July 18, 1950 |
| 2,539,511 | Hansen et al. | Jan. 30, 1951 |
| 2,556,969 | Mason | June 12, 1951 |

OTHER REFERENCES

Proceedings of the I. R. E., March 1947, pages 310 to 314. Copy in Division 51.